United States Patent
Hermsen et al.

(10) Patent No.: US 6,874,944 B1
(45) Date of Patent: Apr. 5, 2005

(54) FACEPLATE AND OPTICAL FIBER CONNECTOR MOUNTING ASSEMBLY

(75) Inventors: Eric Hermsen, Wall, NJ (US); David J. Maxham, Jamesburg, NJ (US); William F. Ruthrauff, Howell, NJ (US); Gerard L. Paluzzi, Jr., Brick, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 10/357,968

(22) Filed: Feb. 4, 2003

(51) Int. Cl.[7] .............................................. G02B 6/38
(52) U.S. Cl. ...................................................... 385/55
(58) Field of Search ..................... 385/53, 55, 136–138

(56) References Cited

U.S. PATENT DOCUMENTS

| | | | |
|---|---|---|---|
| 5,708,742 A | | 1/1998 | Beun et al. |
| 5,949,946 A | | 9/1999 | Debortoli et al. |
| 6,158,899 A | * | 12/2000 | Arp et al. ....................... 385/53 |
| 6,435,727 B1 | * | 8/2002 | Fingler et al. ................. 385/53 |
| 6,543,940 B2 | * | 4/2003 | Chu .............................. 385/53 |
| 2002/0159708 A1 | * | 10/2002 | Nelson ......................... 385/53 |

OTHER PUBLICATIONS

Lucent Technologies, "LC Product Specification," No. 1, (Sep. 5, 2000).

* cited by examiner

*Primary Examiner*—Javaid H. Nasri

(57) ABSTRACT

An optical fiber connector mounting assembly mounts an optical fiber connector such that the connector is located outside of a faceplate to facilitate access to an end face of the connector. The mounting assembly secures and protects the optical fiber connector. In one embodiment, the optical fiber connector includes a strain relief boot that allows the connector to be moved within a limited bend radius.

5 Claims, 6 Drawing Sheets

US 6,874,944 B1

FACEPLATE AND OPTICAL FIBER CONNECTOR MOUNTING ASSEMBLY

TECHNICAL FIELD

The present invention relates to faceplates used with circuit boards and more particularly, to a faceplate and optical fiber connector mounting assembly in which an optical fiber connector is located on the outside of the faceplate.

BACKGROUND INFORMATION

Optical fibers are often connected to printed circuit boards in optical/electronic equipment. The circuit boards are typically mounted vertically on shelves with a faceplate coupled to each circuit board. The optical fibers are connected to optical fiber connectors, which are mounted behind the faceplate wall (often referred to as a "behind the wall" or "BTW" connector). The faceplate accommodates a bulkhead adapter to allow another optical fiber connector (often referred to as the jumper connector) to be connected to the "behind the wall" connector.

The end face of the BTW connector typically must be cleaned to ensure effective operation of the connector. Because the BTW connector is located behind the faceplate wall, the current cleaning methods attempt to clean through the bulkhead adapter ferrule. In some cases, cleaning equipment is used to blast vapors through an opening in the faceplate to clean the end face of the optical fiber connector. These current methods of cleaning the end face of the BTW optical connectors are tedious, time consuming, expensive, and often ineffective. Cleaning methods should also avoid damage to the connector and fiber.

Various faceplate designs have attempted to facilitate cleaning by providing access to the end face of the BTW connectors. Examples of these designs are disclosed in U.S. Pat. Nos. 5,708,742 and 5,949,946, incorporated herein by reference. These faceplate designs require a number of moving components to access the end face of the connector, such as a removable or sliding carrier.

Accordingly, there is a need for a faceplate assembly in which an optical fiber connector can be accessed and cleaned more easily while still protecting the connector from being damaged.

SUMMARY

In accordance with one aspect of the present invention, an optical fiber connector mounting assembly is used to facilitate cleaning of an end face of an optical fiber connector. The optical fiber connector mounting assembly comprises a faceplate having an inside and an outside and an optical fiber connector mounted with respect to the faceplate such that an end face of the connector is located on the outside of the faceplate. An adapter is coupled to the optical fiber connector and is located on the outside of the faceplate.

According to another aspect of the present invention, an optical fiber connector mounting assembly comprises an optical fiber connector adapted to be connected to an optical fiber and a mounting bracket for mounting the optical fiber connector such that the fiber connector is located outside of the faceplate. The assembly also comprises a hood for covering an aperture in the mounting bracket and a bulkhead adapter adapted to be positioned over the optical fiber connector.

According to a further aspect of the present invention, an optical fiber connector mounting assembly comprises a faceplate for mounting to the circuit board and a mounting bracket including a mounting portion for mounting to the circuit board. The mounting bracket also includes a face portion having an aperture for receiving the optical fiber connector. The face portion is adapted to be positioned over an opening in the faceplate such that an end face of the fiber connector is located outside of the faceplate. A hood covers the aperture of the mounting bracket and includes an opening at a bottom portion for allowing the fiber connector to pass through.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1A:
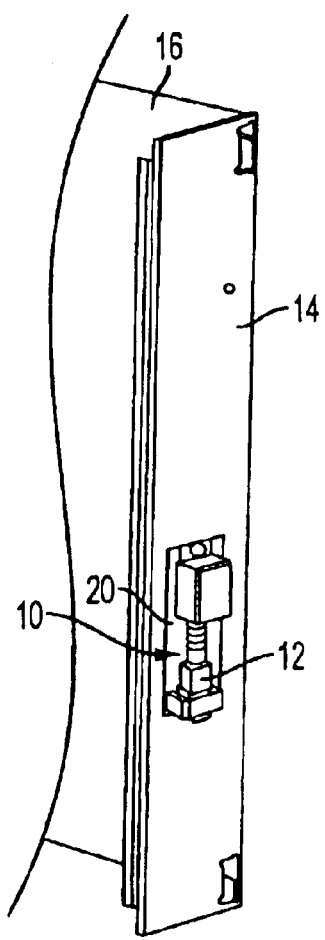
FIG. 1A is a front perspective view of a faceplate, according to one embodiment of the present invention.
Figure 1B:
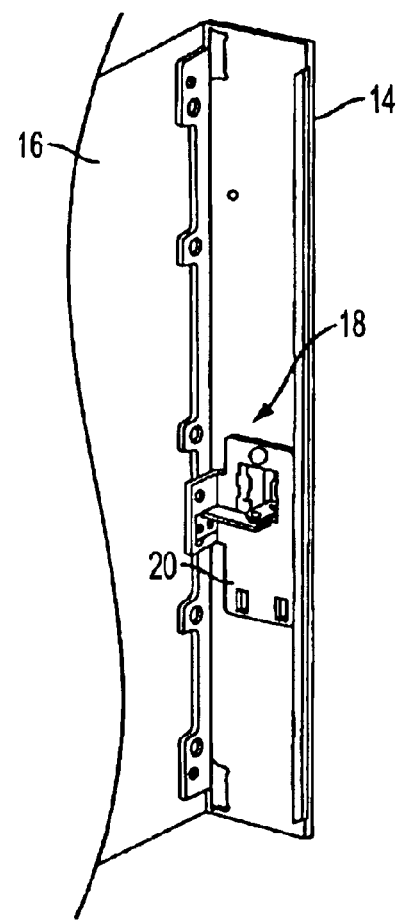
FIG. 1B is a rear perspective view of the faceplate shown in FIG. 1A.

Referring to FIGS. 1A and 1B, an optical fiber connector 10 and bulkhead adapter 12 are mounted with respect to a faceplate 14 such that an end face (not shown) of the optical fiber connector 10 can be accessed without having to remove the faceplate 14 or go behind the faceplate 14. Thus, the end face of the optical fiber connector 10 can be cleaned more easily. In the exemplary embodiment, the faceplate 14 is mounted to one or more circuit boards 16 with one or more optical fibers (not shown) extending from the circuit boards 16 through the faceplate 14 to the optical fiber connector 10. One example of the optical fiber connector 10 and bulkhead adapter 12 used in the present invention is the type defined by the LC Product Specification available from Lucent Technologies, Inc., although other optical fiber connectors and bulkhead adapters can be used.

Each optical fiber connector 10 is mounted to a mounting assembly 18, as will be described in greater detail below. The mounting assembly 18 is preferably mounted to the circuit board 16 but can also be mounted to other structures (e.g., to the faceplate 14). Although the exemplary embodiment shows only one optical fiber connector 10 mounted with respect to the faceplate 14, multiple optical fiber connectors can be mounted to a faceplate using multiple mounting assemblies.

One embodiment of the mounting assembly 18 is shown in greater detail in FIGS. 2–5. This embodiment of the mounting assembly 18 includes a mounting bracket 20 including a face portion 22 having an aperture 24 and a mounting portion 26 for mounting to the circuit board 16 (shown in FIG. 1B). The mounting bracket 20 is preferably made of sheet metal, or other suitable materials. The optical fiber connector 10 passes through the aperture 24 and is positioned adjacent the face portion 22. A hood 28 covers the aperture 24 and has an opening at the bottom to allow the optical fiber connector 10 to pass through. The hood 28 is secured to the mounting bracket 20, for example, using a screw 29 or other type of fastener or attachment technique. The hood 28 is preferably made of sheet metal, or other suitable materials. Alternatively, the mounting bracket and the hood can be made as one piece.

Figure 1C:
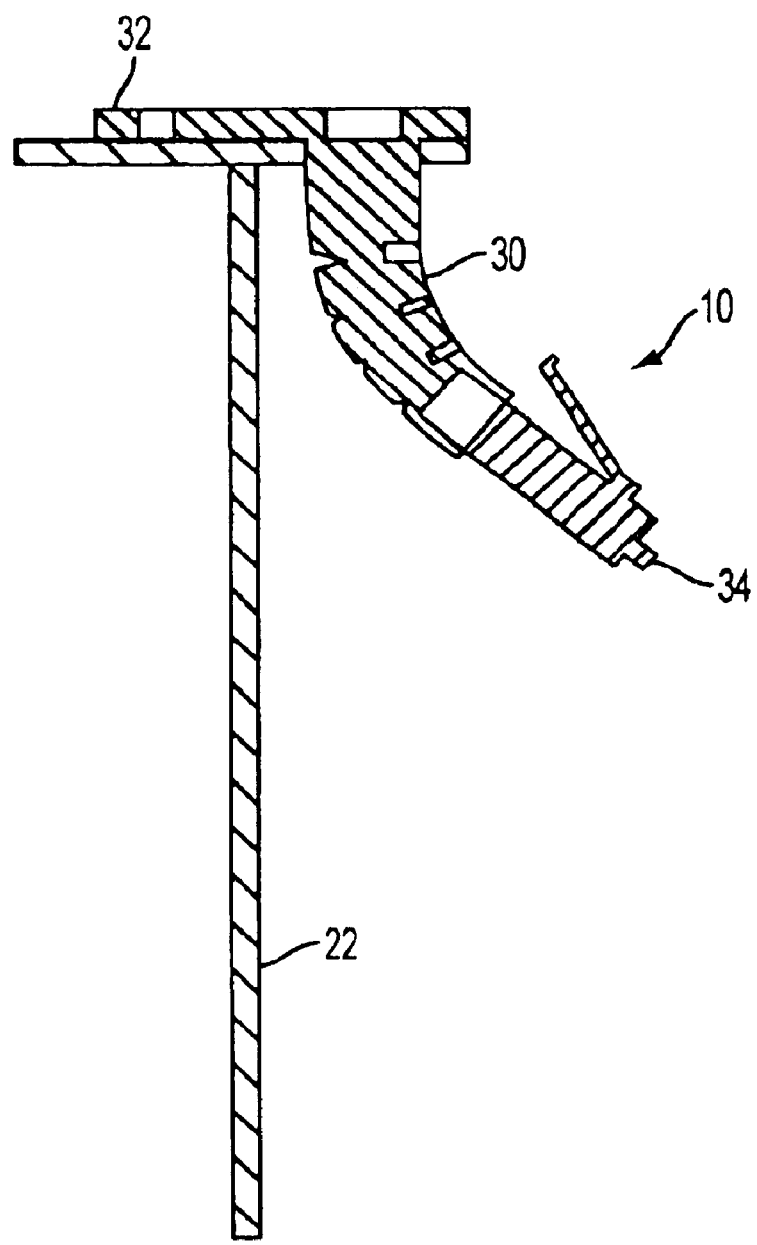
FIG. 1C is a side view of an optical fiber connector bending away from the faceplate.
Figure 2:
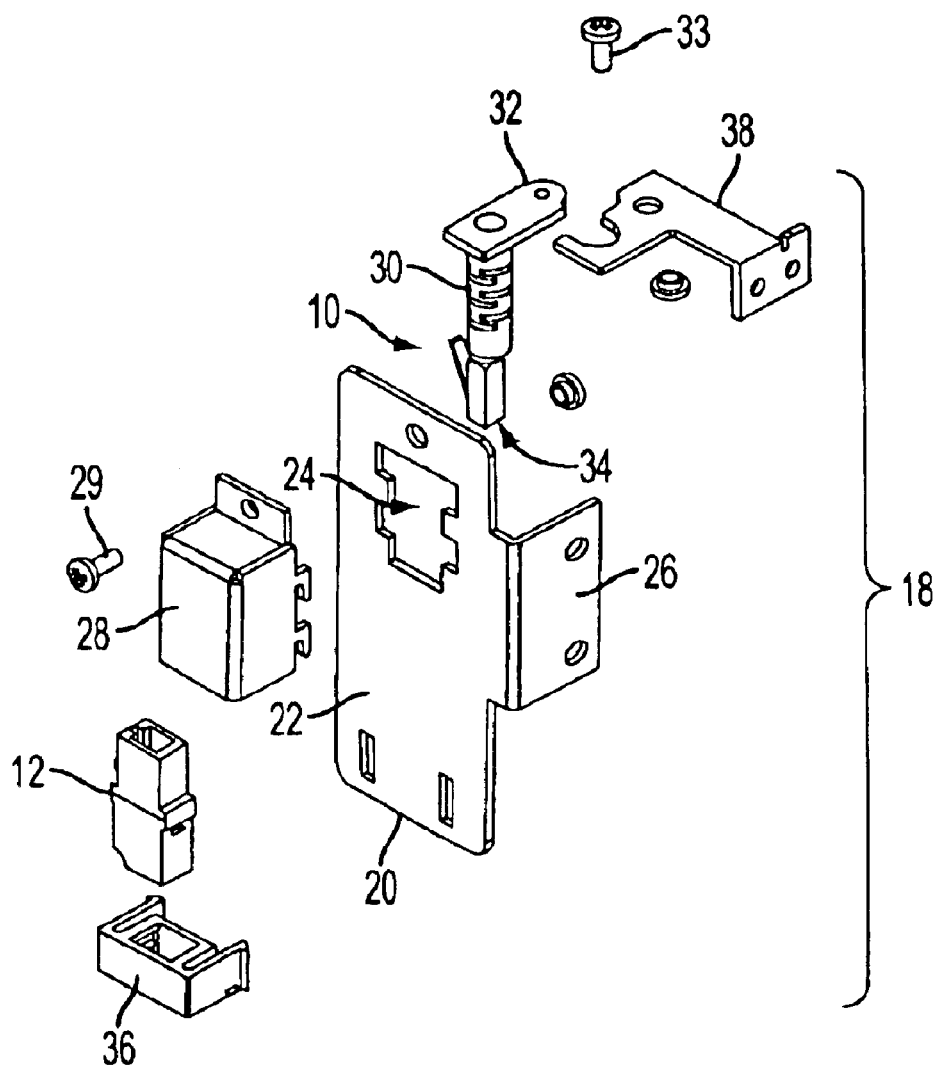
FIG. 2 is an exploded view of an optical fiber connector mounting assembly, according to one embodiment of the present invention.
Figure 3:
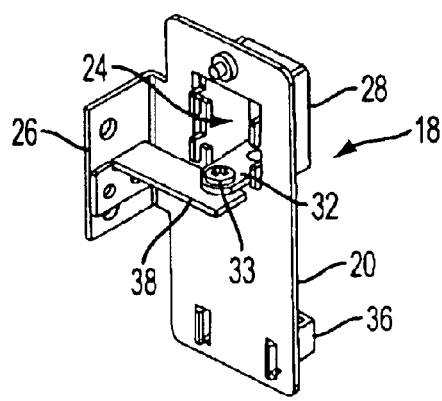
FIG. 3 is a rear perspective view of the optical fiber connector mounting assembly of FIG. 2.

In this embodiment, the optical fiber connector 10 includes a strain relief boot 30 preferably having a flange 32. The strain relief boot 30 provides strain relief to the optical fiber connector 10 and the connected fiber (not shown) and allows the optical fiber connector 10 to be bent away from the face portion 22 and from the faceplate 14 to was the end face 34 of the optical fiber connector 10, as shown in FIG. 1C. The strain relief boot 30 limits the bend to a set radius, for example, in the range of about ½ to 2 inches. The boot 30 and flange 32 are preferably made of a thermoplastic elastomer or other suitable materials capable of providing the desired bend radius.

Figure 4:
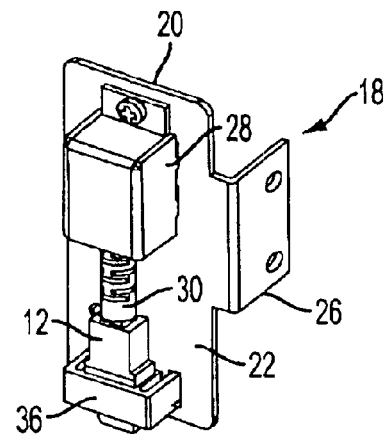
FIG. 4 is a front perspective view of the optical fiber connector mounting assembly of FIG. 2.

The optical fiber connector 10 is preferably secured against the face portion 22 of the mounting bracket 20, for example, using a clip 36 that holds the bulkhead adapter 12 (see FIG. 4). This prevents horizontal movement of the optical fiber connector 10 and shearing. The clip 36 is preferably made of plastic or other suitable materials. A flanged boot mounting bracket 38 is secured to the flange 32 of the boot 30, for example, using a screw 33 (see FIG. 3).

Although the exemplary embodiment shows specific shapes and configurations for the elements of the optical fiber connector 10, bulkhead adapter 12 and mounting assembly 18, other shapes and configurations are within the scope of the present invention.

The faceplate 14 (FIG. 5) preferably includes an opening 15 for receiving each optical fiber connector 10 and mounting assembly 18. The mounting bracket 20 is preferably positioned on the inside behind the faceplate 14 such that the face portion 22 of the mounting bracket 20 covers the opening 15. The hood 28, the optical fiber connector 10 with the strain relief boot 30, the adapter 12, and the clip 36 all pass through the opening 15 to the outside of the faceplate 14.

Another embodiment of the mounting assembly 18 is shown in greater detail in FIGS. 6–9. This embodiment of the mounting assembly 18 also includes a mounting bracket 40 including a face portion 42 having an aperture 44 and a mounting portion 46 for mounting to the circuit board 16 (shown in FIG. 1B). The optical fiber connector 10 passes through the aperture 44 and is positioned adjacent the face portion 42. A hood 48 covers the aperture 44 and has an opening at the bottom to allow the optical fiber connector 10 pass through. The hood 48 provides structural integrity and is secured to the mounting bracket 40, for example, using a screw 49 or other type of fastener or attachment technique.

In this embodiment, the mounting bracket 40 and hood 48 can also be made of plastic, or other suitable materials. Alternatively, the mounting bracket and the hood can be made as one piece.

Figure 7:
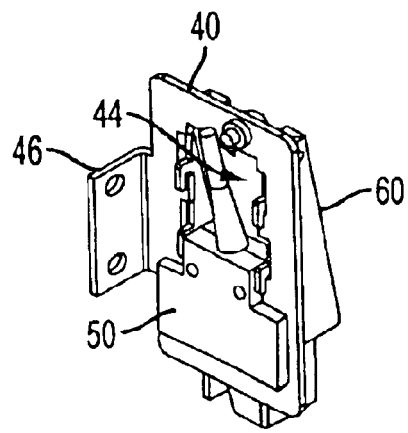
FIG. 7 is a rear perspective view of the optical fiber connector mounting assembly of FIG. 6.
Figure 8:
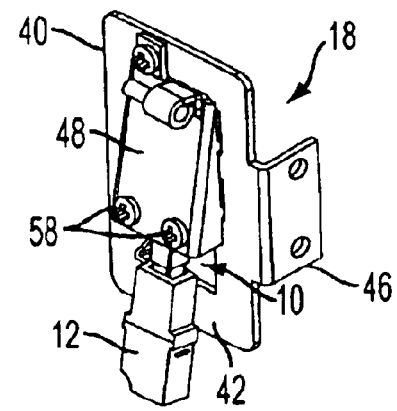
FIG. 8 is a front perspective view of the optical fiber connector mounting assembly of FIG. 6 without the cover.

In this embodiment, the optical fiber connector 10 is clamped to the mounting bracket 40 with a clamp 50 and clamping shim 52 secured around a base 54 of the optical fiber connector 10 (see FIG. 7). The clamp 50 preferably includes a clamping rib 56 to axially retain the fiber connector 10. The hood 48 can be secured to the clamping shim 52 and clamp 50 using screws 58. The clamp 50 and clamping shim 52 are preferably made of metal or other suitable materials. According to another alternative, the connector 10 and adapter 12 can be mounted directly to the hood 48 instead of using the clamp 50 and clamping shim 52.

Figure 9:
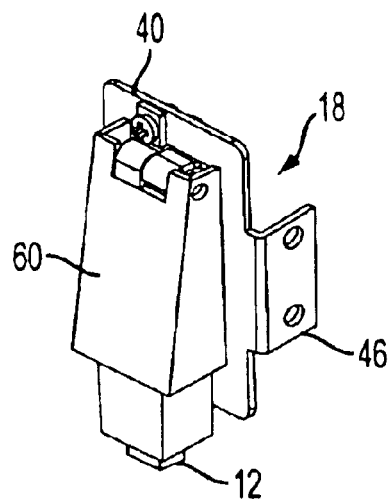
FIG. 9 is a front perspective view of the optical fiber connector mounting assembly of FIG. 6 with the cover.

A hinged cover 60 preferably covers the hood 48, the optical fiber connector 10 and the adapter 12 (see FIG. 9). In the exemplary embodiment, the hinged cover 60 is coupled to the hood 48 using a hinge pin 62, allowing the hinged cover to pivot upwardly. The hinged cover 60 can be made of sheet metal or other suitable materials.

Figure 5:
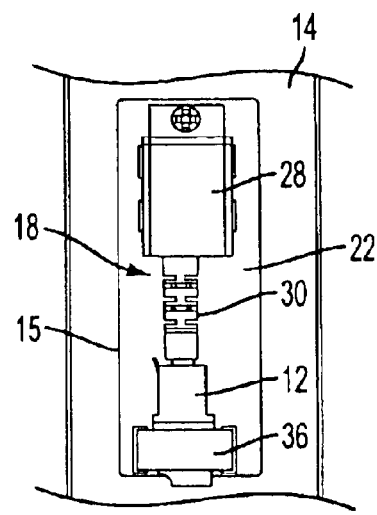
FIG. 5 is a front view of the optical fiber connector mounting assembly of FIG. 2 assembled with a faceplate.
Figure 6:
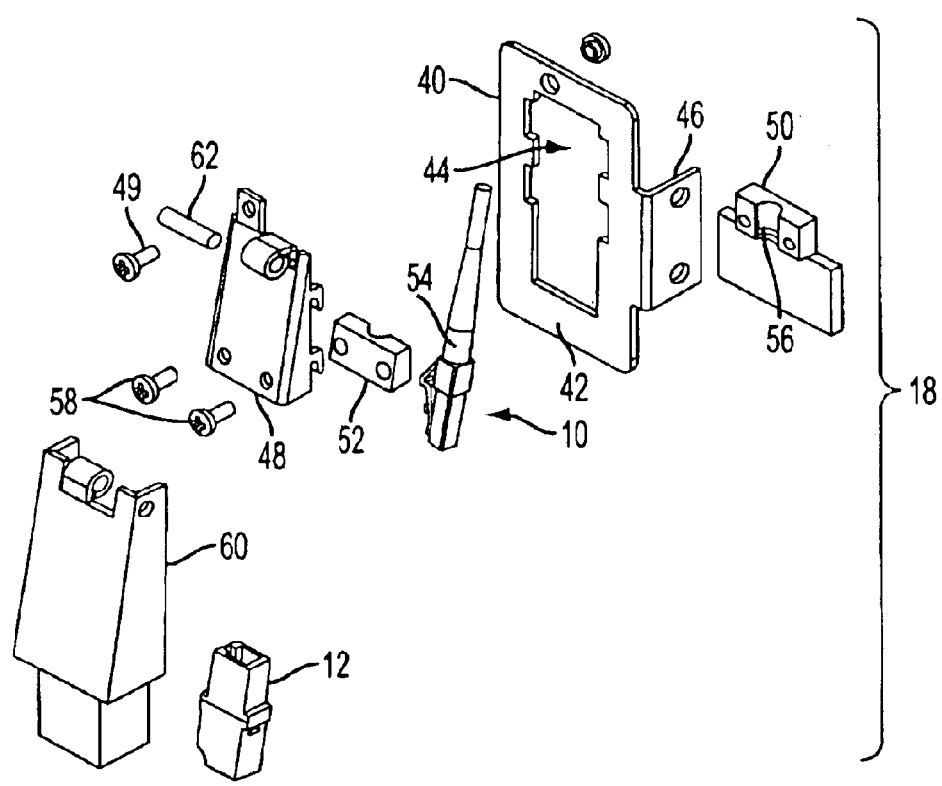
FIG. 6 is an exploded view of an optical fiber connector mounting assembly, according to another embodiment of the present invention.

Although the exemplary embodiment shows specific shapes and configurations for the elements of the optical fiber connector 10, bulkhead adapter 12 and mounting assembly 18, other shapes and configurations are within the scope of the present invention. This embodiment of the mounting assembly 18 shown in FIGS. 6–9 can also be mounted with respect to the faceplate 14 generally in the same manner as shown in FIGS. 1A, 1B and 5 and described above.

In use, the end face of the optical fiber connector 10 can be accessed without removing or reaching behind the faceplate 14. In the embodiment shown in FIGS. 2–5, the clip 36 and the bulkhead adapter 12 are removed. The optical fiber connector 10 can then be bent away from the faceplate 14 for cleaning the end face 34 of the connector 10. In the embodiment shown in FIGS. 6–9, the hinged cover 60 is hinged upwardly and the bulkhead adapter 12 is removed to expose the end face of the connector 10 for cleaning. If there is a need to access the circuit board, the faceplate 14 can be removed. In one preferred embodiment where the mounting assembly 18 is mounted directly to the circuit board 16, the optical fiber connectors 10 are not loose when working on the circuit board. Having the ability to mount the fiber connector directly to the circuit board allows the circuit module assembly to be manufactured and tested as a subassembly prior to the faceplate installation.

Accordingly, the optical fiber connector mounting assembly of the present invention mounts the optical fiber connectors to facilitate cleaning of the end face of the connectors while protecting the connector from damage.

Modifications and substitutions by one of ordinary skill in the art are considered to be within the scope of the present invention, which is not to be limited except by the following claims.

The invention claimed is:

1. An optical fiber connector mounting assembly for use with a circuit board, said optical fiber connector mounting assembly comprising:
   a faceplate having an inside and an outside, wherein said faceplate is configured to be mounted to said circuit board such that said circuit board extends from said inside of said faceplate;
   an optical fiber connector having a flexible strain relief boot and an end face;

a mounting bracket mounting said optical fiber connector with respect to said faceplate such that said connector with said strain relief boot is accessible from said outside of said faceplate, wherein said connector is bendable away from a face portion of said mounting bracket and from said faceplate for cleaning said end face of said connector; and an adapter coupled to said optical fiber connector.

2. The optical fiber connector mounting assembly of claim 1 further comprising a clip mounting said adapter to said mounting bracket.

3. The optical fiber connector mounting assembly of claim 1 further comprising a hood covering an aperture in said mounting bracket.

4. The optical fiber connector mounting assembly of claim 1 wherein said strain relief boot includes a flange.

5. The optical fiber connector mounting assembly of claim 4 further comprising a flanged boot mounting bracket secured to said flange of said stain relief boot.

* * * * *